Oct. 27, 1953  R. G. WILLIAMS  2,657,338
LIGHTING CONTROL SYSTEM
Filed Aug. 15, 1950  7 Sheets-Sheet 1

INVENTOR.
ROLLO GILLESPIE WILLIAMS
BY
ATTORNEY.

Oct. 27, 1953  R. G. WILLIAMS  2,657,338
LIGHTING CONTROL SYSTEM
Filed Aug. 15, 1950  7 Sheets-Sheet 2

INVENTOR.
ROLLO GILLESPIE WILLIAMS
BY
ATTORNEY.

Oct. 27, 1953  R. G. WILLIAMS  2,657,338
LIGHTING CONTROL SYSTEM
Filed Aug. 15, 1950  7 Sheets-Sheet 3

*INVENTOR.*
ROLLO GILLESPIE WILLIAMS
BY
ATTORNEY

FIG. II

Oct. 27, 1953   R. G. WILLIAMS   2,657,338
LIGHTING CONTROL SYSTEM
Filed Aug. 15, 1950   7 Sheets-Sheet 6

FIG. 14

INVENTOR.
ROLLO GILLESPIE WILLIAMS
BY
ATTORNEY

FIG.15

Patented Oct. 27, 1953

2,657,338

UNITED STATES PATENT OFFICE 2,657,338

LIGHTING CONTROL SYSTEM

Rollo Gillespie Williams, Great Neck, N. Y., assignor, by mesne assignments, to Duro-Test Corporation, North Bergen, N. J., a corporation of New York Application August 15, 1950, Serial No. 179,603
In Great Britain August 16, 1949

25 Claims. (Cl. 315—295)

This invention relates to lighting control systems and particularly to a novel method and means for selecting combinations of sources of light, colored and uncolored, and controlling the intensity of light emitted therefrom whereby illumination having a wide range of colors may be created.

One of the objects of this invention resides in the provision of control apparatus for a color lighting system having a plurality of light sources associated therewith, said apparatus having at least two means for selecting and bringing into operation certain light sources whose illumination is to be combined and having further means for varying the intensity of the light emitted from the selected sources, the rate of intensity variation of one source of light being different from and preferably a multiple of the rate of variation of the other sources. It is to be understood that a light source, as mentioned herein, may consist of a single source of light, as, for example, a single red, blue, or white lamp, or it may include a plurality of sources, all of which are of the same color. In addition to the two selecting means mentioned above, it is preferred that there shall be additional selecting means for selectively bringing the sources into operation, said additional selecting means having no light intensity variation means associated therewith. In a preferred form of the apparatus all of the selecting means and the variation intensity means should be actuated by a common control device so that the light emitted at any position of said device is predetermined; it is also preferred that the indicator associated with the indicator scale shall be operated directly or indirectly by the same device so that the emitted light corresponds with the light indicated by the indicator on the scale; furthermore, the indicator may be dispensed with and a predetermined cyclical variation of color hues obtained; also different cyclical variations may be obtained as desired.

Another feature of the invention resides in the provision of means whereby either or both of said selecting means may function to bring selectively into operation individual sources of light or a combination of two or more of said sources; for example, at certain stages of operation of the apparatus either or both selecting means may bring into operation individual sources of light and at other stages may bring into operation two or more of said sources; when one selecting means brings into operation a single source the other means may bring into operation a plurality of said sources.

From another aspect, the invention may be said to reside in a color lighting system having means for selectively rendering predetermined sources of a plurality of light sources available for operation in combination with means for varying the light emitted from selected sources of those made available. In other words, a plurality of different ranges of hues are available for selection in combination with means for selectively obtaining the desired hue in the selected range. If the control apparatus is provided with a scale as outlined above, selected of the ranges are marked on the scale and a separate control is provided for selecting the desired range; the range having been first selected, the desired color in that range is now obtained by moving the indicator to the color shown in the selected range.

By the present invention means are provided whereby the light smoothly merges without a break from any selected color in one range to any selected color in another range; furthermore, any selected color may be smoothly dimmed to nil. The invention also provides means whereby a number of selected colors can be obtained at a lighting intensity less than the normal full brightness of the selected color.

In color lighting control apparatus heretofore used, it was customary to employ a dimmer, with its associated mechanism, for the control of each light source. An important object of the present invention is to control four sources of light by two dimmers, thereby effecting a substantial decrease in cost and reduction in bulk of the control apparatus.

Another object of the invention is to provide flexibility in selecting groups of colors so as to afford a variety in the range of illumination, as, for example, a deep color range, or a pastel range, or others.

The invention will be clearly understood from the following description when read in connection with the attached drawing in which.

Figure 10:
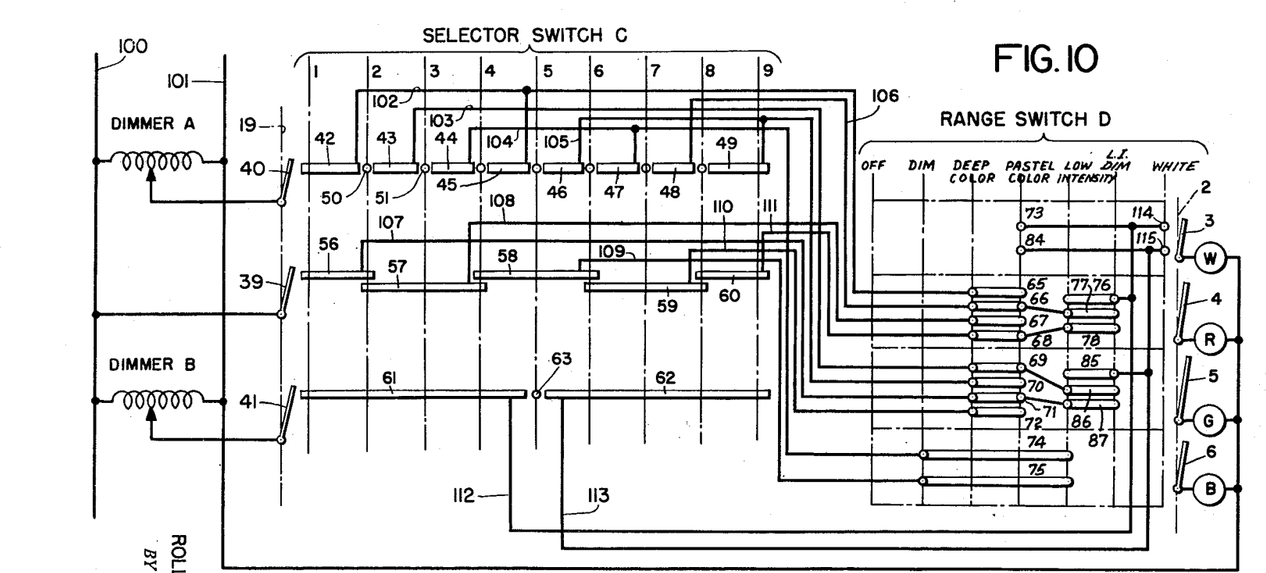
Fig. 10 is a circuit diagram showing the electrical connections in one form of embodiment of this invention.

For the sake of convenience in describing the invention, it will be assumed that the color lighting system in which the present invention is embodied, has four light sources, namely, red, green, blue, and white, as indicated in Fig. 10, and that those sources are so arranged and controlled in the present invention that the colors emitted therefrom will either be unmixed or will mix or mingle to produce different hues or shades of colors as desired. As mentioned hereinbefore, each light source may consist in a single light emitting element, such as a lamp, or may include a plurality of such elements all of which provide the same color of illumination.

The underlying principle of this invention will best be understood from the following description of the circuit shown in Fig. 10, which shows schematically one form of embodiment of the invention. In that circuit 100 and 101 represent the conductors of an alternating current lighting circuit from which are derived the voltages to be applied to the lamps for the production of color illumination, the neutral or grounded side of that circuit being represented by conductor 101, but it is to be understood that direct current may be employed with suitable resistors for the production of the required voltages. To the A. C. circuit 100—101 are connected two dimmers designated A and B. The form in which those dimmers are represented in Fig. 10 is that of an auto-transformer, but it is to be understood that other forms of dimmers, such as, for example (but without limitation), saturable reactors, electronic devices or resistors may be used. The movable contact members of dimmers A and B are electrically connected to brush-arms, such as 40 and 41, respectively, of a selector switch C. The brush-arm 39 is electrically connected directly to the feeder side, that is to say, the non-neutral or non-grounded side of the lighting circuit. The brush attached to the arm 40 is adapted to make contact with a plurality of conductive segments such as 42 to 49, inclusive, of switch C, each of which is connected to a conductive segment of a range switch D; similarly, the brush attached to arm 39 is adapted to make contact with a plurality of conductive segments such as 56 to 60, inclusive, of the switch C, each of which segments is connected to a conductive segment of switch D; and the brush attached to arm 41 is similarly arranged to make contact with segments such as 61 and 62 of switch C, each of which is connected to two contact points and a segment of switch D. The segments of the range switch D to which are connected segments 42 to 49, inclusive, and also 56 to 60, inclusive, of the selector switch C, are in turn connected through the brush-arms 4, 5, and 6 to the red, green, and blue lamps, the particular connections depending upon the position at any instant of the switch D. Segment 61 of switch C is connected by lead 112 to the conductive segment 76 of switch D and is also connected to terminals 73 and 114 of the latter switch. Segment 76 will be connected to the red lamp when the brush of arm 4 makes contact therewith and in like manner the terminals 73 and 114 will be connected through brush-arm 3 to the white lamp. Segment 62 of switch C is connected by lead 113 with segment 85 of switch D which will be connected to the green lamp when the brush of arm 5 makes contact therewith. That same lead is also connected to contacts 84 and 115 through which a connection to the white lamp may be established by the brush-arm 3.

Figure 5:
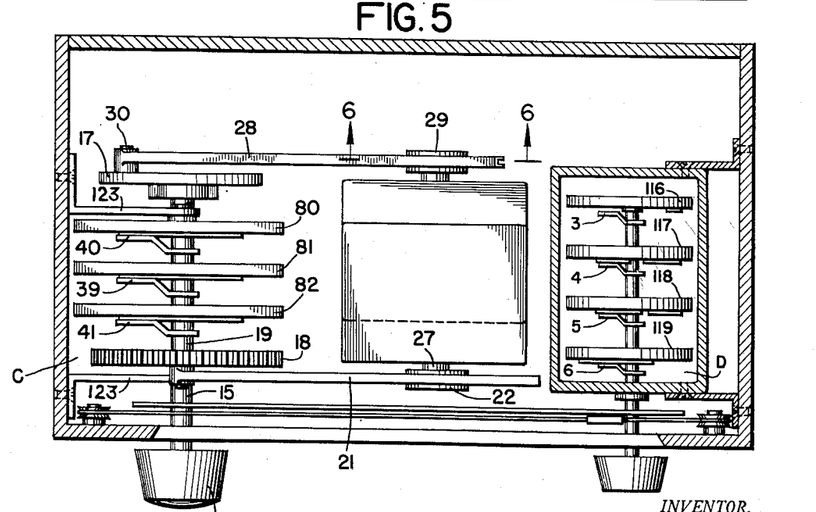
Fig. 5 is a horizontal sectional view of the apparatus along the line 5—5 of Fig. 4.
Figures 8, 12:
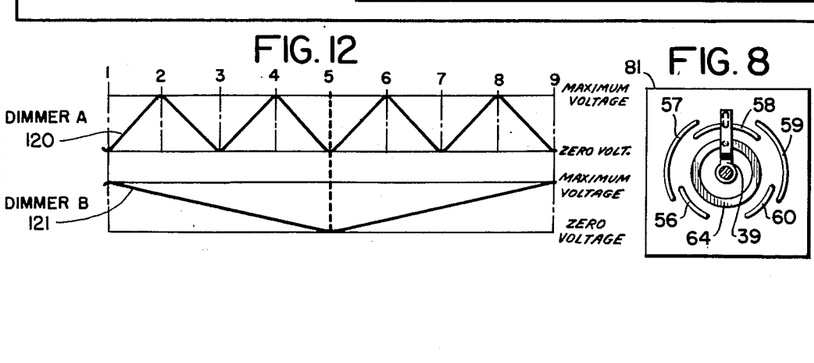
Fig. 8 shows the movable arm and the segments mounted upon the insulating plate 81 of switch C.
Fig. 12 indicates the voltages of the dimmers for various positions of the selector switch of Fig. 10.

The conductive segments 42 to 49, inclusive, of switch C, are preferably arranged as arcs of a circle upon an insulating plate such as 80 shown in Fig. 5. Between the adjacent segments is shown a dead stud which is electrically insulated from the segments and other parts of the apparatus but it is to be understood that that stud and others shown upon the drawing and mentioned hereinafter are not essential to the operation of the apparatus. The conductive segments 56 to 60, inclusive, are arranged as arcs of two concentric circles upon an insulating plate such as 81 as shown in Fig. 8, the segments being of such length and so positioned that the brush will make simultaneous contact with two consecutive segments at positions 2, 4, 6 and 8 of the switch. The segments 61 and 62 are mounted upon an insulating plate such as 82 in Fig. 5, and arranged preferably as arcs of the same circle with a dead stud positioned between the segments. The brush-arms 40, 39 and 41 are preferably mounted upon the same shaft, 19, and are so aligned that the brushes of all of said arms will make contact with their respective first segments at the substantially same instant.

Figure 9:
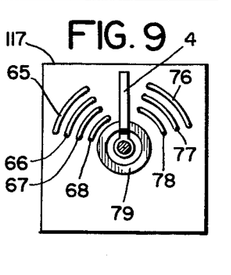
Fig. 9 shows the movable arm and the segments of that portion of the range switch D associated with the red light as shown in Fig. 10.

The brush-arms 3, 4, 5, and 6 of switch D are preferably mounted upon the same shaft, 2, as shown in Fig. 5, and are in alignment so that at each operative position of the switch (except the "off" position) contact will be made between the segments at such operative position and the corresponding brushes of the switch. The conductive segments of the range switch D are mounted upon insulating plates, such as 116 to 119, inclusive, shown in Fig. 5. Those segments are arcuate in form as shown in Fig. 9 which represents the arrangement of the segments 65 to 68, inclusive, and 76 to 79, inclusive, with which brush 4 is designed to make contact at the positions indicated in Fig. 10. The segments and the contact points with which the brushes of the other arms of switch D are arranged to make contact would be so positioned upon their respective insulating plates as to enable the brushes to make contact therewith at the several operative positions of the switch as indicated in Fig. 10. Thus each segment of the group 65 to 68, inclusive, of switch D is connected electrically to a segment of switch C as shown in Fig. 10; segments 66 and 68 are also connected to segments 77 and 78, respectively, of switch D, and segment 76, as mentioned before, is connected to lead 112. The brush on arm 4 is arranged to make contact simultaneously with all segments in the group 65 to 68, inclusive, or the group 76 to 78, inclusive, so that all segments of each group will be connected through the arm 4 and the ring 79 (Fig. 9) to the red lamp shown in that circuit. Similarly, contacts of the groups 69 to 72, inclusive, and 85 to 87, inclusive, are arranged upon the insulating plate 118 and connected through brush-arm 5 with the green lamp of that circuit. Segments 74 and 75 are, in like manner, arranged upon plate 119 for connection through the brush-arm 6 with the blue lamp; and contacts 73, 84, 114 and 115 are also mounted upon insulating plate 116 for connection through the brush-arm 3 with the white lamp. The range switch is designed to be moved at will by the operator and is mechanically independent of the remainder of the control mechanism.

As will be described more fully hereinafter, the contact member of dimmer A is mechanically controlled by a knob, such as 14, which is the same member that controls the movement of the brush-arm 40 of switch C, so that there is a definite relationship between the instantaneous voltages produced by dimmer A and the position of the brush-arm 40 during the course of its passage over the segments 42 to 49, inclusive, the relationship being shown by the upper graph, 120, of Fig. 12. The contact member of dimmer B is also controlled by the same member that controls the brush-arm 41, viz., the knob 14, and, in consequence, there is likewise a definite relationship between the voltage produced by dimmer B and the position of brush-arm 41 during its passage over the segments 61 and 62, the voltage relationship being shown by the lower graph 121 of Fig. 12. From those graphs it will be seen that while the voltage on dimmer B passes through one cycle, that of dimmer A passes through four complete cycles. It is to be understood that the number of cycles mentioned is purely by the way of illustration and is not to be construed as a limitation upon the invention. The means for maintaining the aforedescribed relationship between dimmer voltages and positions of the brush-arms, and the purpose in maintaining the voltage relationships between the two dimmers will be fully described hereinafter.

The manner in which the aforedescribed apparatus operates to effect the production of a range of hues of colors will now be described. Assuming, for example, that the switch D is set at the "Deep Color" position, the brushes of arms 4, 5, and 6 of that switch will then connect the sources of red, green, and blue light, respectively, to the groups of segments of switch D with which those brushes are then in contact. Let it be further assumed that the knob 14 is turned so that the brushes of the arms 40, 39 and 41 are in contact with segments 42, 56 and 61, respectively, at position 1 of switch C, as shown in Fig. 10. Thereafter the voltages applied by selector switch C to the segments of switch D at the "Deep Color" position are, in turn, applied to two of said sources of light. Thus, the voltage from dimmer A, when brush 40 is at position 1 of switch C, is applied to the red source but since at that instant the voltage is zero, as shown in Fig. 12, no light will emanate from that source. The voltage, which is applied by brush 39 to segment 56 at position 1 of switch C, is, in turn, applied to the source of green light and since that is the full line voltage, illumination of full intensity will come from that source. The voltage from dimmer B produces no effect in the "Deep Color" range since the brush of switch D, viz., 3, to which the voltage of dimmer B is applied, is not in contact with any segment of switch D at the "Deep Color" position. Accordingly, for position 1 of the selector switch C, no red or blue color will be present in the illumination, only green, and that result is shown clearly in Fig. 11, in the graph designated "Deep Color Range."

Figure 11:
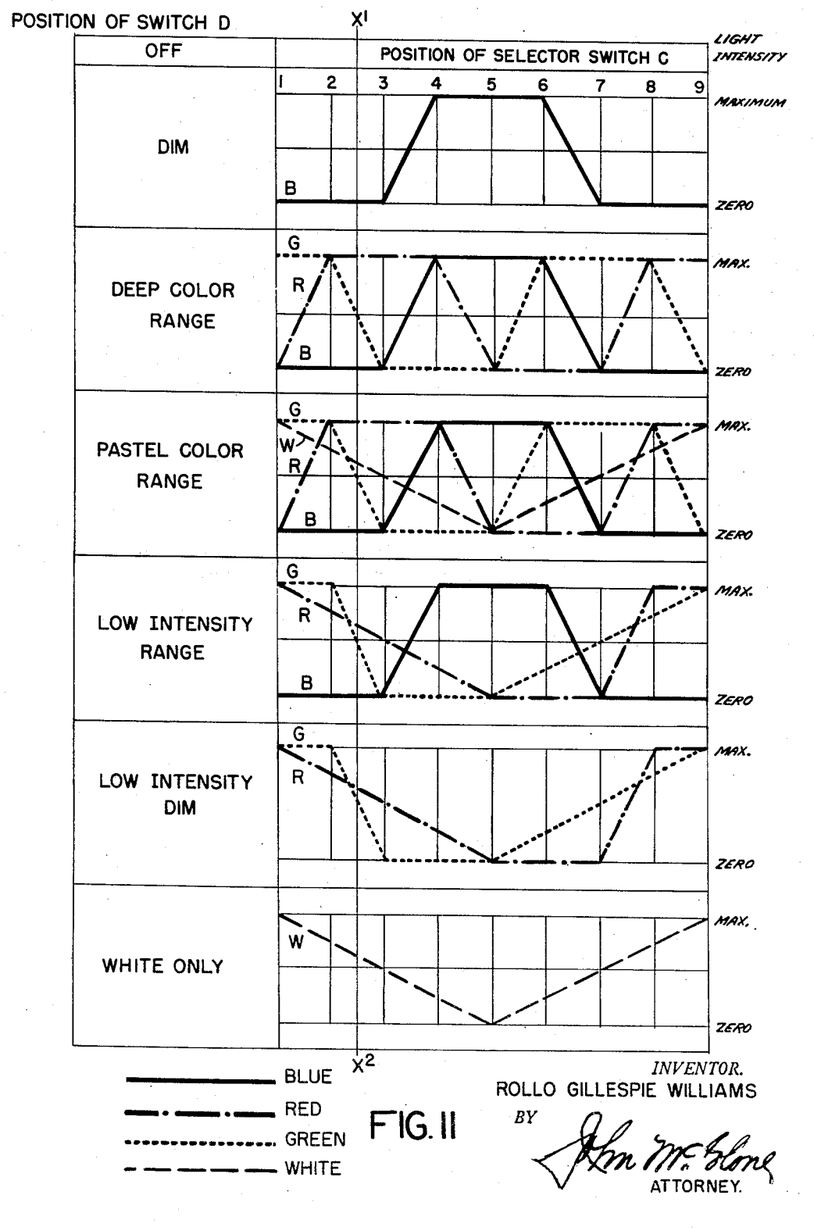
Fig. 11 is a chart representing the intensity of the color or combination of colors for various positions of the brushes associated with the switches of Fig. 10.

Referring again to Fig. 12, it will be seen that as the brush 40 of the selector switch C is moved over the segment 42 between the points 1 and 2, the voltage produced by dimmer A rises. When the brush 40 reaches a position which is just to the left of point 2 (as shown in Fig. 10), the voltage applied to the source of red light will be nearing the maximum voltage of the line circuit as shown in Fig. 12. At that instant brush 39 is in contact with segment 56 which is connected with the source of green light and applies thereto the full line-voltage, thus causing green illumination at full intensity. The resultant hue will be the combination of red and green as shown in Fig. 11 just to the left of position 2. When brush of brush-arm 40 is about to break contact with segment 42, the brush of arm 39 will make contact with segments 56 and 57 simultaneously, the former of which is connected to the source of green light, the latter to the source of red light, both receiving the full line-voltage. The red source will also be receiving maximum voltage from dimmer A so that there is no break in continuity of illumination from the red source when the brush of arm 40 passes from segment 42 to segment 43. Upon the passing of the brush 40 onto segment 43 the voltage of dimmer A will be applied to the green source. Referring to the graph 120 of Fig. 12, it will be observed that the voltage from dimmer A steadily diminishes in value during the course of travel of the brush 40 over segment 43 from left to right. Throughout this same period the full line-voltage is applied by brush 39 to the red source and consequently the illumination will be a combination of green and red, the green color gradually diminishing and vanishing when the brush 40 moves out of engagement with segment 43, the illumination thereafter coming entirely from the source of red light. When the brush 40 moves onto segment 44, the dimmer A will be connected by the lead 104, segment 74, and brush 6 of switch D to the source of blue light. As shown in Fig. 12, the voltage from dimmer A rises from 0 to its maximum as the brush 40 moves over segment 44, and when it reaches the end of that segment, the color and intensity of illumination will be the result of the full illumination of the sources of red and the blue light.

From the foregoing description it will be obvious that as the brush of arm 40 is moved across the remaining segments 45 to 49, inclusive, and at the same time the brush of arm 39 is moved across segments 56 to 60, inclusive, the voltage from the dimmer A and that directly from the line will be applied to a selected pair of sources of colored light producing an illumination having the deep colors, red, green, and blue or combinations thereof, the resultant color of illumination depending not only on the colors selected but also upon the voltages applied to the lamps at each instant as shown in the "Deep Color Range" graph of Fig. 11.

If the segments of selector switch C were permanently connected to certain sources of colored light, such as red, green, and blue, to which they are now connected through the segments and brushes of switch D for the "Deep Color" setting of that switch, the range of illumination variation that the control system is capable of producing would obviously be greatly limited. To avoid such limitation the leads from the segments of selector switch C are not permanently connected to the sources of light but to the segments of the range switch D, and, in consequence, it is possible to obtain many ranges of colors that otherwise would be lost. For example, if the range switch D is set at the "Pastel Color" position the shades or hues resulting therefrom will be those indicated along the upper edge of the chart 38, Fig. 2, which represents the combination of the deep colors, red, green, and blue with white. Those shades or hues range from "warm white" at position 120 on the chart 38 to "cold white" at position 0 thereon. If the knob 14 is set so that the indicator needle is at 120 on the chart, which corresponds with position 1 of the selector switch C, the voltage of dimmer A will be applied to the red source, that of dimmer B to the white source and the full line voltage will be applied through brush-arm 39 to the green source. At that instant the voltage of dimmer A is zero, as shown in Fig. 12, and that of dimmer B is the maximum. The resultant illumination is the combination of green and white at full voltage, the sources of red and blue light providing no illumination, as indicated by the "Pastel Color" graph of Fig. 11.

If knob 14 is now rotated so that the indicator needle is moved to position 110 on the color scale, the brush-arms 41, 39 and 40 will have reached a position which is just short of position 2 in Fig. 10 and the dimmers A and B will be correspondingly positioned. At this point the red lighting circuit connected to dimmer A will be nearing full-voltage, as shown in Fig. 12; the green lighting circuit connected to brush 39 will continue at full strength, and the white lighting circuit connected to brush 41 will be at a somewhat reduced lighting intensity as shown by graph 121 of Fig. 12.

If the indicator needle 37 is again moved to position 105 on the scale, the brushes 41, 39 and 40 will be as shown at position 2 in Fig. 10 and the dimmer voltages will be as shown in Fig. 12. At this position the brush of arm 40 is in contact with a dead stud such as 50, so that the red lighting circuit is no longer connected to dimmer A. However, the brush of arm 39 is now in contact with both segments 56 and 57, the former being connected to the green lamp and the latter connected through contact 67 of switch D to the red lamp as mentioned hereinbefore in describing the "Deep Color" method. Both red and green circuits are, therefore, directly connected to the mains by means of brush-arm 39 and therefore receive full voltage. The white lighting source remains connected to dimmer B but at a lower lighting intensity since the voltage is dropping. The hue resulting is that comprising red and green illumination at full intensity and white of diminishing intensity. As mentioned hereinbefore, when the brush of arm 40 is about to move out of contact with segment 42 and into contact with dead stud 50, the dimmer A is providing full-voltage, as shown in Fig. 12, and the brush-arm 39, while still in contact with segment 56, makes contact also with segment 57. Segment 57 is connected by conductor 108 to the red lamp while segment 42 is also connected thereto which effects the transfer of the red circuit at full-voltage from dimmer A to full voltage direct from the lighting circuit through segment 57. There will be no visible change in the brightness of the red lighting circuit to the eye if segment 57 is contacted by brush 39 before brush 40 breaks contact with segment 42. At position 2 in Fig. 10, we therefore have the red and green lighting circuits at full brightness and the white lighting circuit at a reduced brightness, producing a pale yellow shade as indicated on chart 38, Fig. 2.

If knob 14 continues to be turned until the indicator needle 37 is at position 90 on the scale 38, then the brushes of the arms will be at position 3 in Fig. 10 and the dimmer voltages will be as shown in Fig. 12 for that position. At this point the voltage from dimmer A is at its minimum and brush-arm 40 is on dead stud 51, having broken contact with segment 43 at the bottom of the voltage cycle. The resultant shade or hue will be that produced by the red lamp at full voltage and the white lamp at about one-half its maximum voltage.

The process of selecting the sources of illumination of the desired colors for the production of the pastel shades continues in the manner first described as the brushes of the selector switch C are moved from one position to the next over the remaining segments of that switch until the entire range of shades of color indicated on chart 38, along its upper edge, has been produced.

In addition to the production of pastel colors and the deep colors, as described hereinbefore, other color ranges or effects are made possible through the proper adjustment of the range switch D. Thus, for example, when the brushes of the switch D set at the "Dim" position, the illumination comes solely from the blue source, the intensity of which depends upon the voltages applied by the brushes 40 and 39 to the segments of the selector switch C. If the brushes of switch D are moved to the "Low Intensity" position, the illumination results solely from the sources of red, green, and blue light or combinations thereof (as in the "Deep Color" position), but, as shown in Fig. 11, the voltages applied to the lamps at the "Low Intensity" position differ from those at the "Deep Color" position of the switch D with the result that the illuminating effects differ markedly in the two cases. At the low intensity dim position, designated "L. I. Dim," blue is omitted, only red and green being employed, and at the last position of switch D, the illumination results solely from the sources of white light, as indicated.

The method of operating the apparatus hereinbefore described assumes the setting of the range switch D at a particular position, such as the "Deep Color" or "Pastel Color" position and operating the selector switch C throughout its range to effect the production of colored illumination that varies with selection of color and applied voltage. But the use of the control system is not limited to that method. There are other modes of operation that afford equally desirable results; for example, assume that it is desired to know the range of colored illumination that is obtainable at a particular position, say 97.5 on the scale 38 of the apparatus. If the knob 14 of the selector switch C is turned so that the indicator pointer 37 is placed at that position on the scale, the light sources that are effective at that point and the voltages applied thereto either by the dimmers or directly by the lighting circuit 100—101 will be those indicated at the position of the vertical dotted line X1—X2 in Fig. 11 for the various positions of the range switch. If the range switch is then turned to each of its seven positions, the resultant color hue provided by the lighting circuits will be as follows:

| Range Switch | Final Color of Light (At position 97.5 of scale 38) |
| --- | --- |
| Off | No light. |
| Dim | Do. |
| Deep color range | Orange. |
| Pastel color range | Gold. |
| Low intensity range | Dull yellow. |
| Low intensity dim | Do. |
| White only | Low brightness white. |

Figure 4:
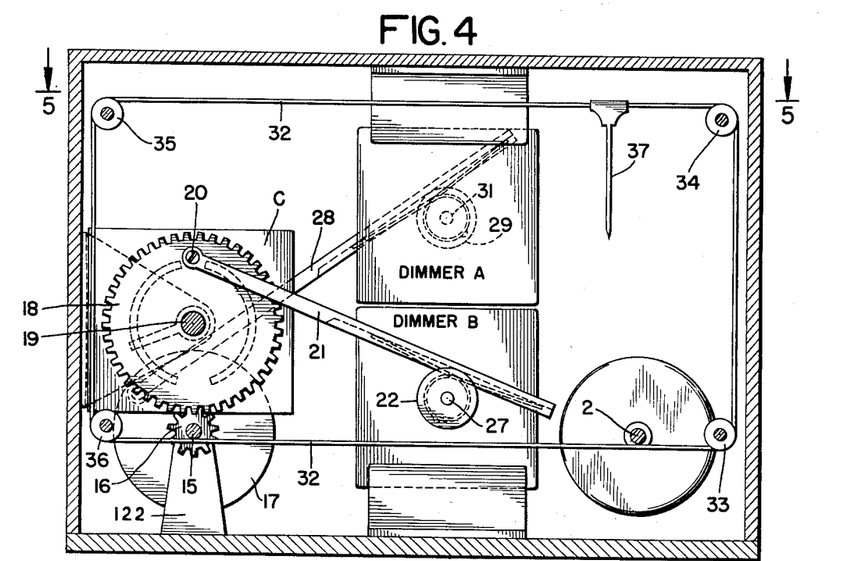
Fig. 4 is a vertical sectional view of the apparatus along the line 4—4 of Fig. 1.
Figures 6, 7:
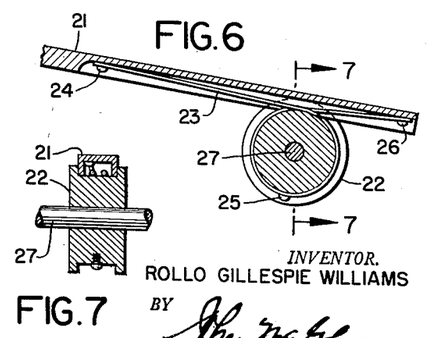
Fig. 6 is a sectional detail view on the line 6—6 of Fig. 5.
Fig. 7 is a sectional view on the line 7—7 of Fig. 6.

The manner in which the selector switch C, the range switch D, and the dimmers A and B may be arranged and controlled mechanically is shown in Figs. 4 and 5 which illustrate one form of embodiment of the invention. As shown in Fig. 5, the knob 14 is mounted upon a shaft 15 to which is fastened at the end nearer the knob, a pinion 16 (shown in Fig. 4), and at the far end of the shaft, a crank wheel 17, said shaft being mounted upon a suitable base 122. The pinion 16 engages with a larger gear-wheel 18, mounted on shaft 19 which is the actuating shaft of the rotary selector switch C, said shaft being supported by the members 123. Gear-wheel 18 has a crank-pin 20 mounted on its outer face to which one end of the arm 21 is rotatably attached. The arm 21 is effectively connected to the controller wheel 22 of dimmer B by which the position of the movable contactor upon the winding of the dimmer may be changed or altered, at will. In the construction shown, by way of example, the means for changing the position of said contactor is illustrated in Figures 6 and 7 from which it will be seen that the arm 21 rests in a groove on the perimeter of wheel 22 and is fastened to said wheel by means of a wire cable 23, secured at 24 and passed round the outside of wheel 22 (to which it is secured at point 25), and then finally secured again to arm 21 at point 26. It will, of course, be understood that a chain or a rack and pinion may be substituted for the cable shown. Accordingly, when the arm 21 is pulled and pushed as the result of the rotation of the gear-wheel 18, it will impart a rotary motion to the wheel 22, which motion is transmitted to the shaft 27 to which the movable contactor of dimmer B is fastened.

The movement of the contactor of dimmer A is effected in similar manner by means of arm 28, one end of which is connected to the crank-pin 30 of the crank-wheel 17, and the other end of said arm is connected to the wheel 29 by a wire cable so as to impart rotary motion to the shaft 21 of dimmer A and to the movable contactor thereof.

It will be noticed that the rotary motion imparted to each dimmer is reciprocating in character inasmuch as one revolution of a crank-pin, such as 30, around the axis of a crank-wheel, such as 17, will cause dimmer shaft 31 of dimmer A to be rotated first in one direction and then in the other. In practice, the exact amount of movement imparted to the dimmers may be adjusted by mounting the crank-pin in a radial slot upon the crank-wheel and determining the effective distance of the crank-pin from the centre of the crank-wheel to give the desired angular movement of the dimmer shaft. If this radius is shortened, the angular distance clockwise and counter-clockwise, through which the dimmer shaft moves will be also shortened, and vice versa. Both dimmers A and B are, in the example shown, of a type having rotary action with a total movement of 320°. At 0°, each dimmer provides full light, and at 320° the light is, to all practical purposes, out.

From the foregoing it will be seen that when knob 14 is turned, the resulting rotation of pinion 16, acting through the gear-wheel 18, imparts motion to the shaft 19 of selector switch C and at the same time imparts motion to dimmer B by means of arm 21. Similarly, motion will be imparted at the same time to dimmer A by means of arm 28, connected to crank-wheel 17, at the other end of shaft 15. By means of a pulley, not shown, but which would be fastened to the shaft 15, the movement of the shaft will be transmitted to the cable 32 so as to cause it to move in conjunction therewith. The cable 32 passes over the guide pulleys 33, 34, 35, and 36, and between the pulleys 34 and 35 there is attached to the cable an indicator needle 37 which moves over a color scale 38. From the foregoing it will be clear that the movement of knob 14 simultaneously imparts motion to the indicator needle 37, dimmer A, dimmer B, and rotary selector switch C, and that there is a definite relationship between the position of the needle and that of the contact members of the dimmers and the position of the brush-arms of switch C.

Figure 1:
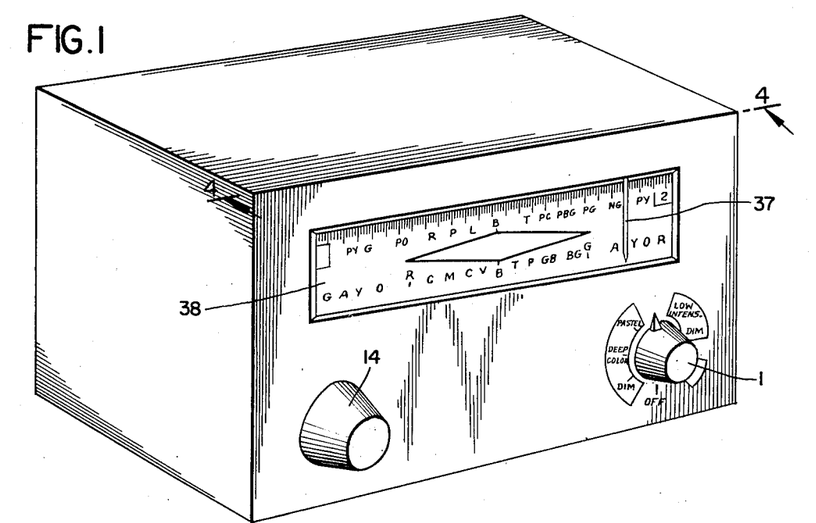
Fig. 1 is an external view of the cabinet in which is mounted the apparatus in which the present invention is embodied.

In the example under consideration, the gear ratio of gears 18 and 16 is 4 to 1, and consequently dimmer A which is actuated from a crank-wheel 17 mounted directly on shaft 15, will operate four times as often as dimmer B. This is shown by the graphs 120 and 121 of Fig. 12 which represent the voltage variation of the dimmers A and B, respectively, for four complete revolutions of the shaft 15. Each complete revolution of shaft 15 causes the shaft of dimmer A to rotate through the total angular distance of 320°. Since the dimmer B is controlled by the movement of the gear 18, which revolves but once during four revolutions of the crank wheel 17, the shaft of dimmer B will be rotated first in one direction and then in the other direction through the total angular distance of 320° only once during the time in which the shaft of dimmer A is moving four times through the same angular distance. Accordingly, the voltage applied to the circuit by dimmer B, which is shown by the lower curve 121 of Fig. 12, will pass through one cycle during the time in which the voltage produced by dimmer B (as shown by graph 120) passes through four cycles. The variation of the voltage of dimmer B through four cycles and that of dimmer A through one cycle is effected by turning the knob 14 the necessary number of turns, during which period of time the indicator needle 37 will move across the full extent of the indicator scale 38, shown in Figs. 1 and 2.

In order to show more clearly the arrangement of the apparatus in the casing in which it is mounted and the mechanical connection between various parts, the electrical connections of the control circuit have been omitted in Figs. 4 and 5, but it is to be understood that the apparatus shown in those figures is electrically connected in the manner shown in Fig. 10.

From the foregoing description it will be seen that the desired range of colors and hues are obtained in the present invention by the employment of only two dimmers whereas in known color lighting control apparatus one dimmer with associated mechanism is required for each light source; hence by the present invention costs are reduced and bulk decreased. Furthermore, in some known types of apparatus it is customary first to actuate a member to select a desired color or hue and then to actuate another member to produce that color or hue; by the present invention, the desired color or hue in any predetermined range of colors is immediately obtained merely by moving the selector switch to the desired location.

A particular feature of the invention is the layout of the color scale as illustrated in the drawings. It will be appreciated that the provision of a plurality of scales of different "tpyes" or ranges of color is of considerable advantage; any of the ranges can be selected at will and it is possible by the invention to merge from any color in one range to any color in another range without a break in the lighting. It will be seen that all the ranges of colors or hues terminate in the same color (preferably but not necessarily blue) at the same point in the scale, viz., point 60. The method of merging from one color in one range to a color in another range consists in bringing the indicator needle 37 to point 60, then turning the range switch D to the position for the desired new range and then moving the indicator 37 to the desired color shown in that range. Any color can be dimmed out by first moving the indicator from the color in question to point 60, then moving the range switch to "Dim" position and then moving the indicator to either end of the diamond in the centre of the scale; at each end the blue light is reduced to no light. When one wishes to start with no light at all and then brighten up into some color, one commences by placing the indicator needle at either point of the diamond shape—with the range switch at "Dim"—then moving the indicator needle to blue at position 60, then moving the range switch to the desired position, afterwards moving the indicator needle to the required color. In order to provide a complete range of low brightness colors the range switch is operated as required between "Low Intensity Range" and "Low Intensity Dim."

Figure 2:
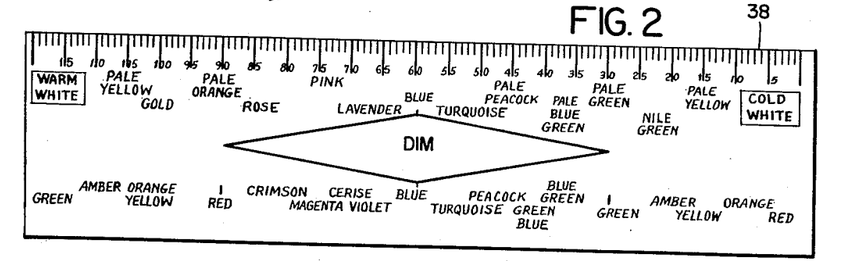
Fig. 2 is an enlarged representation of the color scale shown in Fig. 1.
Figure 3:
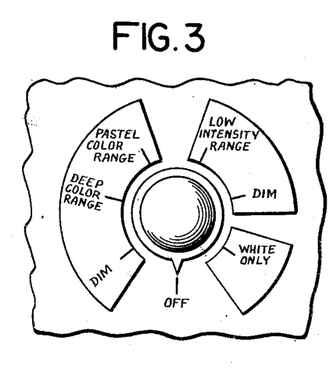
Fig. 3 is an enlarged view of the range control scale and knob shown in Fig. 1.

The arrangements of colors and hues on the lower scale in Fig. 2 is also designed to enable an operator to get from one color or hue to any other hue by a fairly direct route and without the need of having to pass round a complete color circle in order to get the change. Inasmuch as this new controller is not a pre-set machine and the lighting actually changes when the needle is moved by the knob 14, one will have to pass through the colors shown as coming between any two selected hues. However, this color scale is designed in such a manner that in most cases one passes in a fairly direct manner from color to color. Obviously, a circular scale may be employed, instead of the rectangular scale shown in Figs. 1 and 2, the pointer of which may be directly or indirectly controlled by the shaft 15 which is rotated by the knob 14.

The mechanism as shown in Figs. 6 and 7 for imparting a reciprocal motion to a dimmer, is an improvement on the usual sine movement. It will be seen that the crank-arm 21 not only thrusts or pulls, but also changes its angle of contact with the top of wheel 22 in the course of its motion. This double movement tends to change the flat portions of the sine curve and gives more useful movement to the dimmer when the crank-pin is around 3 o'clock and 9 o'clock.

If the apparatus is connected to a direct current source of electricity the auto-transformer dimmers referred to herein would obviously be replaced by dimmer resistors or other suitable brightness control and the wiring circuit would be slightly altered, the manner of doing which will be obvious to anyone skilled in the art.

Figure 13:
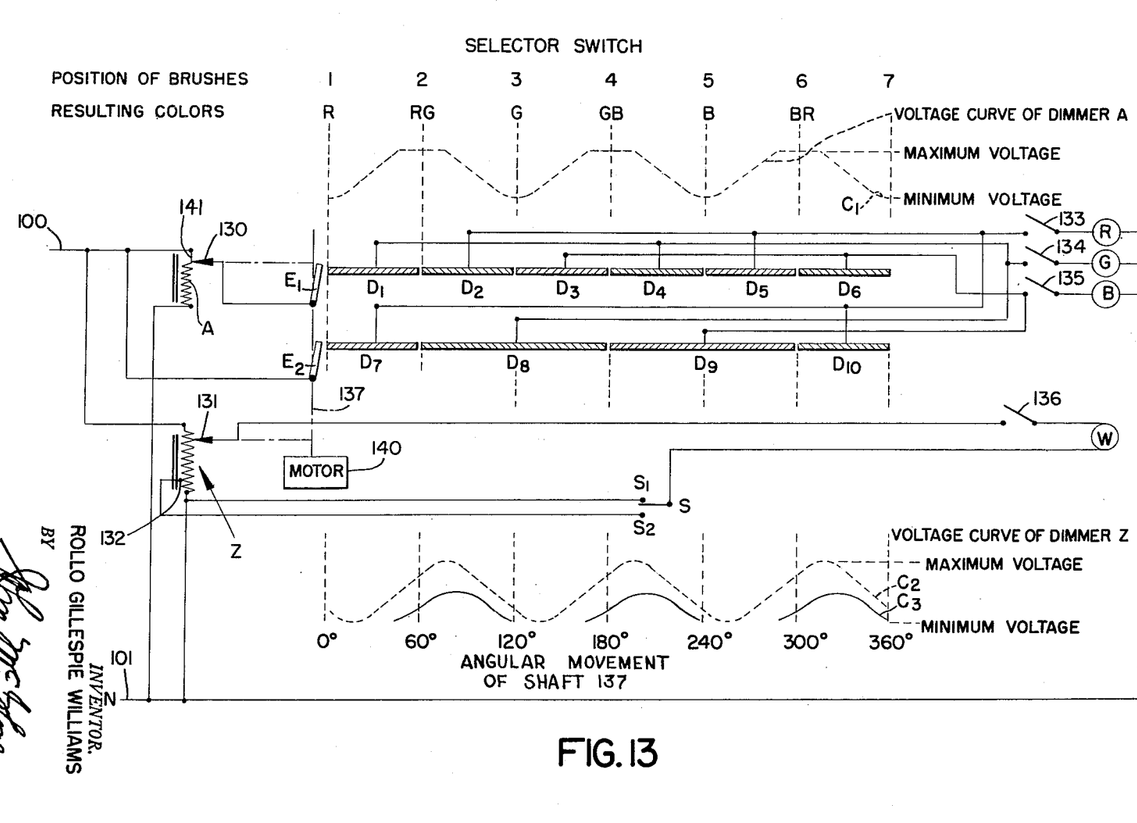
Figs. 13 and 15 are circuit diagrams showing the electrical connections of modifications of the invention in which the cyclical variation on the intensity of light emission of one group of colors is out of phase with that of the other group.
Figure 15:
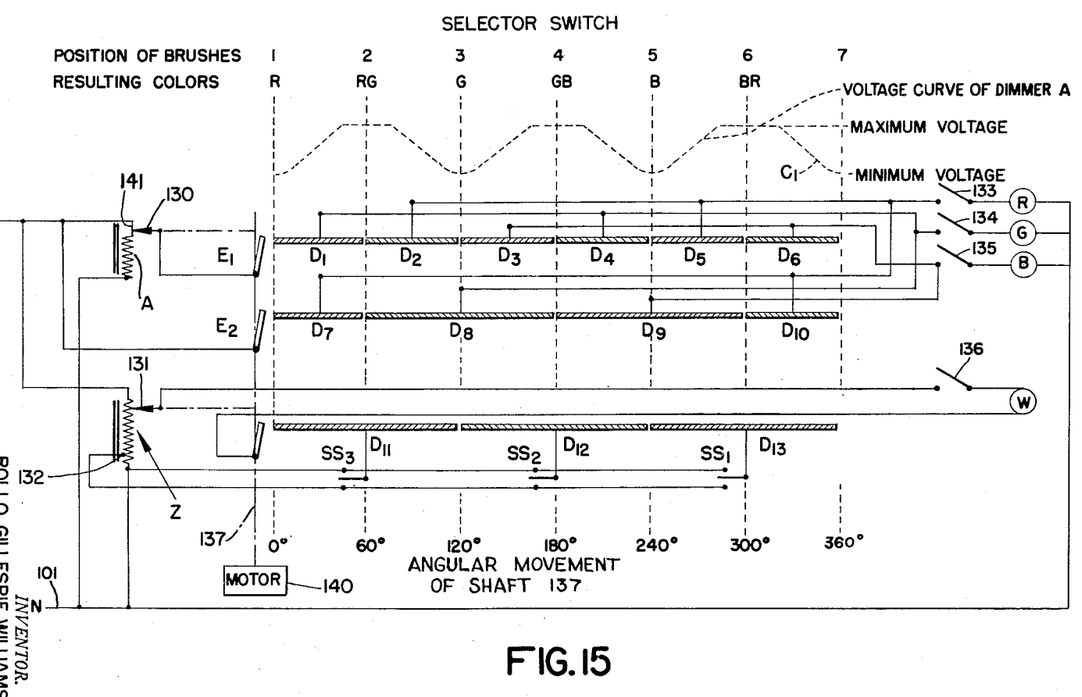

Figs. 13 and 15 disclose in diagrammatic form embodiments of the invention having means whereby the desired color or hue can be obtained by actuation of a control member in either of two opposite directions at will, and also having improved means for automatic operation of the control mechanism.

The invention, as embodied in Figs. 13 and 15, also consists in the provision of color control apparatus in which the light from two brightness control systems are combined in combination with means for cyclically varying the intensity of the light emitted from the two systems, the cyclical variation of the one system being out of phase with that of the other system. It is preferred that at least one system shall comprise a plurality of light sources of different colors or hues in combination with means whereby coincident with the cyclical variation of intensity of light emitted from that system the hue or color of the emitted light shall change in accordance with a predetermined sequence. That is to say, at each phase of rotation of the control apparatus both the color or hue and intensity of emitted light are predetermined.

In a preferred arrangement the one system comprises a series of differently colored lights and the other system comprises a source of non-colored (white) light. Means may be provided for varying the amount of light emitted from one or both systems during each cyclic variation.

For manual operation of the control member there is preferably provided a color chart and the control member is associated with a pointer or the like which is movable relatively to the chart to indicate emission of that particular hue or color indicated on the chart. In a preferred method of carrying into effect the invention shown in Figs. 13 and 15 a unitary control member is provided which is mounted for rotation through 360° in both clockwise and counter-clockwise directions at will to vary cyclically the intensity of light emitted from the two systems, and the said pointer moves in unison with said control member; it will thus be appreciated that by this means the required hue or color to be emitted can be obtained by rotating the control either in a clockwise or a counter-clockwise direction. If, for example, a red light is being emitted and it is desired then to emit a blue light the control member can be moved from the red to the blue position either in a clockwise or counter-clockwise direction and by this means the control member can be moved through whichever is the shorter of the two arcs of movement to obtain the desired change.

In addition to the two systems mentioned hereinbefore, there may of course be provided other systems (the light of which mingles with the light of the first two systems), and means for cyclically varying the intensity of light from the additional systems, may be provided.

Control apparatus in accordance with the invention shown in Figs. 13 and 15 can be designed for automatic operation, in which case the control member is preferably rotated continuously as by an electric motor, and it may be rotated continuously in the same direction or the direction of rotation may be changed at intervals as desired. Furthermore, means may be provided whereby the speed of rotation may be varied or the rotation may be intermittent, with the result that any desired color or hue may be transmitted for predetermined intervals of time.

A feature of the invention resides in the fact that the cyclical variation of intensity of emitted light from at least one brightness control system is not sinusoidal but is flat topped, but it is desired to state that such flattening of the sinusoidal curve is not essential to the working of the invention, but is preferred.

In the embodiment illustrated in Figs. 13 and 15 there are two dimmers, such as A and Z, and associated with dimmer A is a light transmission system incorporating a source of red light R, a source of green light G, and a source of blue light B, and associated with dimmer Z is a light transmission system consisting solely of a source of white light W. It will be appreciated that any suitable source of white and colored light may be utilized and the transmitted light from all the sources is blended or mingled to give the desired color or hue.

Merely by way of example, it may be said that the colors may be mingled or blended in the manner set out in the specification of my co-pending application, Serial No. 28,306, filed May 21, 1948. In the particular embodiment illustrated in Figs. 13 and 15 auto-transformers are employed, but, as mentioned hereinbefore, dimmers of any suitable type, such as reactors, electronic devices or resistance dimmers may of course be used if desired.

The voltage applied to the two light systems is cyclically varied by any convenient means and if desired the means disclosed in Figs. 4 and 5 and described hereinbefore, may be employed. The contact members 130 and 131 of the dimmers A and Z, respectively, would preferably be moved by arms such as 28 and 21 shown in Figs. 4 and 5, but to obtain the same rate of voltage variation for dimmers A and Z, the arms would have to be moved at the same rate. This could be done by connecting both arms to the same crank-pin, as 30, or by connecting the arm 21 to another crank driven by another pinion, such as 15 meshed with gear 18. The arms for operating the dimmers A and Z are indicated by the dot-and-dash lines connected to the shaft 137 in Figs. 13 and 15. The cyclical variation of the voltage from dimmer A is represented by the sinusoidal curve C1, the top of which has been flattened, and that from dimmer Z, by the curves C2 and C3 which are out of phase with C1, the phasing being controlled by adjustment of the dimmers. These curves merely indicate the type of voltage variation and are not necessarily accurate; it will be appreciated that the variation of emitted light from the light transmitting systems is related to that of the applied voltage. As mentioned, the curve C1 is flat topped, that is to say, during approximately 20% of each cycle in the example shown, the maximum voltage is maintained without variation but it is to be understood that the percentage may be varied as desired. This flat-topped curve is achieved by making the dimmer contact brush associated with dimmer A, move over a contact plate (indicated by 141) at full potential during, say a few degrees, of its upward travel. The winding of dimmer Z is tapped at a point such as 132, to provide a source of current of lower voltage, as represented by the curve C3, for application to the white lamp.

Associated with the three sources of colored light comprising the first light transmitting system are a series of conductive segments, D1, D2, D3, D4, D5, D6, D7, D8, D9, and D10. These are conveniently mounted in the form of arcs on suitable discs or plates of insulating material and brushes for wiping them are provided as indicated at E1 and E2. Conveniently, there are two brushes, and brush E1 wipes segments D1–D6, inclusive, and brush E2 wipes segments D7–D10, inclusive. These brushes are mounted on a shaft, indicated by the dot-and-dash line 137, which can be manually rotated clockwise or counter-clockwise as desired, and a pointer P (Fig. 14), connected directly or indirectly with the shaft 137, rotates in unison with the brushes E1 and E2.

The construction of these discs, segments, and brushes, would, in principle, be substantially as illustrated in Figs. 8 and 9, differing structurally in the number of segments and their positioning upon the insulating discs. For convenience, the segments are depicted in Figs. 13 and 15 in the form of a linear projection, the color changes being effected by moving the brushes (theoretically) linearly relative to the segments.

If the brushes E1 and E2 are so moved to the several positions 1, 2, 3, etc., the different sources of colored light and combinations thereof, from which light will be emitted as a result of such movement, are represented by the letters R, G, B, associated with the curve C1.

Associated with dimmer Z in Fig. 13, is a switch S having two contacts, S1 and S2. When switch S is moved to contact S1, the applied voltage varies cyclically between maximum and minimum and the intensity of the emitted white light varies similarly as is indicated by curve C2, but when the switch S is moved to contact S2, the maximum applied voltage is reduced and the cyclical variation of the applied voltage and the intensity of the emitted white light is represented by curve C3.

From the foregoing it will be apparent that the white light controlled by dimmer Z commences to have a marked effect in the color mixture during the period that the color lighting controlled by dimmer A and associated mechanism is remaining constant, that is, during the flat topped phase. At the point when the white light is reaching its peak and is about to diminish, the light controlled by dimmer A also commences to reduce the intensity of transmitted light from the color system of the red, green and blue colors, and it will be obvious from a consideration of the diagrammatic curves that there will be a constantly changing mixture of light the results of which are very effective.

Each dimmer preferably completes three full cyclical variations as indicated by the curves C1, C2, and C3, when the brushes of the segmental switches have rotated through 360°, but obviously, any desired number of cyclical variations may be employed.

Figure 14:
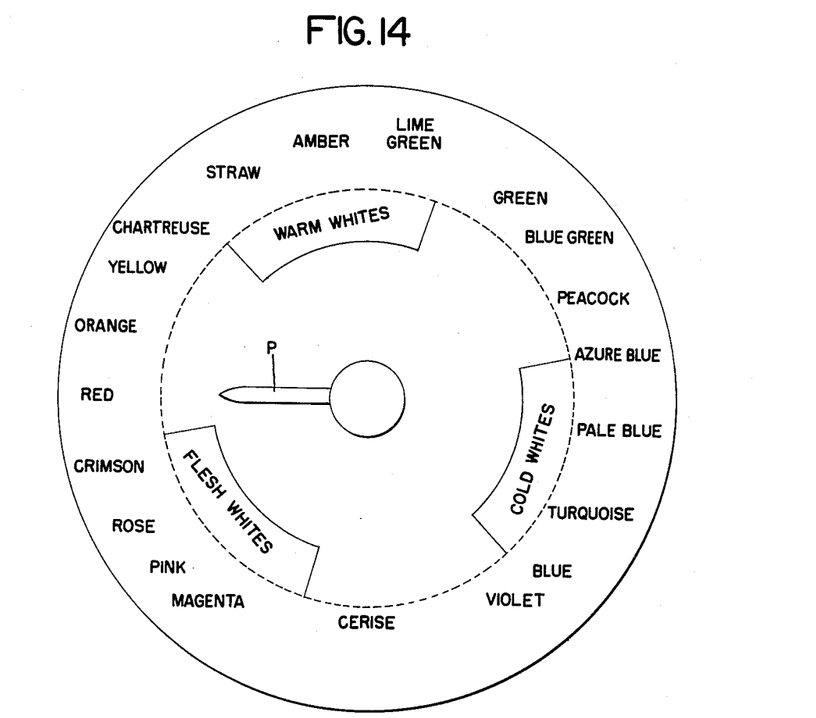
Fig. 14 is a color chart showing the colors and hues attainable by the arrangements of Figs. 13 and 15.

Referring now to Fig. 14, it will be seen that there is an inner and an outer scale of light, and as the pointer moves clockwise or counter-clockwise the hues or colors indicated on the outer scale are obtained when switch S closes the contact S2, and the inner scale of light is obtained when the switch closes the contact S1. As the pointer is moved around the scale, the color or hue of illumination changes as indicated. For example, if the pointer is in the location indicated upon the chart, Fig. 14, and switch S is in contact with contact S2, red light will be transmitted. If now it is desired to transmit a hue such as magenta, the pointer is moved in counter-clockwise direction, but if it is desired to transmit a hue such as amber, then obviously the pointer would be moved in a clockwise direction. It will thus be seen that by the present invention the operator need not move the controller through the whole range of colors to effect the desired color change.

When the switch S closes contact S2, the value of white light is considerably reduced. When contact S1 is closed, the "flesh whites," the "warm whites," and "cold whites," indicated on the inner scale, can be obtained by rotation of the pointer to the positions indicated on the chart. It is desired to point out that in the regions between the zones "warm whites," "flesh whites," and "cold whites," the colors of the resulting illumination will be those shown in the outer circle.

The pointer in the position shown in Fig. 14 corresponds to the position of brushes E1, E2, making contact with the two left-hand ends of contacts D1 and D7 of the selector switch.

For the purpose of explanation, it will be assumed that when the pointer is moved in a clockwise direction the brushes move in the diagrammatic drawing of Fig. 13 linearly from left to right and produce the complete color change shown in the outer sketch of Fig. 14.

It will be readily appreciated that the apparatus in accordance with this invention can be used for automatic color mixing such as by rotating the operative parts from an electric motor or other convenient source of power. The motor which is represented diagrammatically by 140 is connected by any suitable means, directly or indirectly, with the shaft 137, and may rotate continuously in the same direction at a constant speed or the speed may be varied and/or the motor may at intervals be reversed thereby giving variety to the color effects produced by the apparatus. If it is desired to transmit selected colors for predetermined intervals of time the motor may be intermittently rotated; for example, a ratchet and pawl mechanism, or any convenient form of notching mechanism, may be employed, or some of the teeth on the pinion of a driving member, such as 16 of Fig. 4, may be omitted. Consequently, although the motor may rotate continuously, the operative mechanism of the control apparatus is rotated intermittently so that at intervals any desired hue or color may be emitted for any predetermined length of time. Means for disengaging and reengaging the motor at will may be employed, and there may be a clutch between the control apparatus and the motor which may be engaged and disengaged by automatic means at predetermined intervals of time so that desired colors will be emitted during such periods. While in Figs. 13 and 15 of the drawing, a motor drive is indicated, it is to be understood that the rotation of the shaft 137 may be effected by the use of a knob such as 14 of Fig. 5.

For automatic variation the switch S of Fig. 13 may be replaced by switches SS1, SS2, SS3, as shown in Fig. 15, which indicates a suitable wiring for the automatic operation of control apparatus in accordance with the invention. The switches SS1, SS2, and SS3, are double-throw switches, the movable contacts of which are connected to segments D11, D12, and D13, respectively, with which the brush E3 is arranged to make contact as it is moved across those segments simultaneously with the movement of brushes E1 and E2, said brushes being fastened to the shaft 137. Accordingly, at three different points in the cycle of white lighting it is possible to apply to the white lamp either the full voltage of the dimmer Z, as shown by curve C2 of Fig. 13, or a lower voltage as shown by curve C3 of that figure. Thus, if double-throw switch SS1 is in the up position on the drawing, the dimmer will feed the white lighting circuit with its proportion of the full voltage during the period in which the brush arm is in contact with the associated segment D13. When the same switch is in the down position, the white circuit will be supplied at a lower basic voltage during the same period of the dimmer cycle. Obviously, all of the said switches may be in their upper position at any instant, or all in their lower position, or one or more may be up, and the remainder down, the selection depending upon the color effect desired to be produced. The switches may be operated manually or automatically, as, for example, by cams which may be preset to effect the operation of the several switches in any given direction, viz., up or down, and to maintain the switches in the desired position throughout any desired period of time.

Referring again to Fig 14, reference is again made to the three areas on the inner scale which indicate "warm white," "cold white," and "flesh white." When the three double-throw switches, SS1, SS2, and SS3, are in the up position, the maximum voltage of dimmer Z will produce full illumination of the white lamp, and, consequently, at said areas of the dial, the light provided will be a white light of the nature indicated. When these double-throw switches are in the down position, then the lower value of white illumination resulting from the lower basic voltage will cause the color mixtures given to correspond to the range of color hues named in the outer circle.

It is to be understood that in carrying into effect the invention herein disclosed, there may be a plurality of independent sources of light adapted to emit light of contrasting hue or color, or there may be a single light source and means associated therewith for obtaining different colors. Furthermore, there may be means whereby a single beam emits different colors or a single light source may be adapted to emit a plurality of beams. The source or sources of light may be colored, or may have associated therewith means such as color filters for producing the desired color. While the light sources may be of any type, they are preferably of any suitable electric type with means provided for selectively varying the electrical input to the sources to vary the intensity of emitted light, but any other suitable means for obtaining this result may be employed. The expression, "plurality of light sources," as used herein, means and includes (where the context so permits), a single light source having associated with it means for emitting a plurality of different colors, the said means constituting the "plurality of light sources."

While this invention has been disclosed as embodied in a particular form and arrangement of the parts thereof, it is to be understood that it is not so limited, but that it is capable of embodiment in other forms and arrangements without departing from the spirit and the scope of the appended claims.

What is claimed is:

1. In a control system for color lighting, in combination, a plurality of sources of colored light, two light intensity-varying means, switching means to select each of said plurality of light sources and to connect the selected source to one of said intensity-varying means, a second switching means to connect one of the remaining sources of light to the other of said intensity-varying means, operating means common to both of said switching means and said light intensity-varying means to vary simultaneously the connections of said switching means and said intensity-varying means.

2. The combination defined by claim 1 including means forming part of said common operating means for operating said light intensity-varying means at different rates.

3. In a control system for lighting, in combination, a plurality of sources of light, two light intensity-varying means, switching means to select each of said plurality of light sources and to connect the selected source to one of said intensity-varying means, a second switching means to connect one of the remaining sources of light to other of said intensity-varying means, operating means common to both of said switching means and said light intensity-varying means to vary simultaneously at given intervals said switching means and vary simultaneously and continuously throughout said intervals said intensity-varying means.

4. The combination defined by claim 3 including means forming part of said common operating means for operating said intensity-varying means at different rates.

5. In a control system for lighting, in combination, four sources of light, two light intensity-varying means adapted to vary the light intensity of said sources throughout a given range of values, switching means to select one of said sources and to connect thereto one of said light intensity-varying means, a second switching means to select another of said sources and to maintain the light of the selected source at an intensity equal to the maximum value of the given range of values of said intensity-varying means, said first and second switching means being arranged to interchange the said sources when the intensity of light produced by said first mentioned intensity-varying means reaches its maximum, a third switching means to select a third source and to connect thereto the other of said light intensity-varying means, operating means common to said switching means and intensity-varying means to operate simultaneously said switching means and intensity-varying means, and indicating means controlled by said operating means to indicate the hue resulting from the blending of light from the selected sources.

6. The combination defined by claim 5 including means forming part of said common operating means for operating said light intensity-varying means at different rates.

7. In a control system for color lighting, in combination, a plurality of sources of light, two light intensity-varying means adapted to vary the light intensity of said sources throughout a given range of values of intensity, switching means to select one of said sources and to connect the selected source to one of said light intensity-varying means, a second switching means to select a second of said sources and to maintain the light of the second selected source at an intensity equal to a fixed value of the given range, said first and second switching means being arranged to effect an interchange of the said light sources to which the switching means are connected when the first mentioned intensity-varying means reaches the said fixed value of intensity, a third switching means to select a third source and to connect it to the other of said light intensity-varying means, operating means common to all of said switching means and also to said light intensity-varying means to operate simultaneously all said means, and indicating means controlled by said operating means to indicate the hue resulting from the blending of light from the selected sources.

8. In a control system for color lighting, in combination, four electrical sources of light, two voltage-varying devices, switching means to select a source and to apply thereto the voltage of one of said devices, a second switching means to select a second source and to apply thereto a constant voltage which equals the maximum voltage of the said first device, said first and second switching means being so arranged that at the maximum voltage of the first mentioned device the connections between said switching means and the selected sources will be effectively interchanged whereby the constant voltage will be applied to the first selected source and the voltage from the first mentioned voltage-varying device will be applied to the second selected source, a third switching means to select a third source and to connect thereto the other of said light intensity-varying means, operating means common to all of said switching means and to said voltage-varying devices to operate said means and said devices simultaneously, and indicating means controlled by said operating means to indicate the hue resulting from the blending of light from the selected sources.

9. In a control system for color lighting, in combination, a plurality of electrical sources of light the color of each of which differs from that of the others, two voltage-varying devices, switching means to select in sequence each of said sources of light and to apply thereto the voltage of one of said devices which may be varied throughout a given range of values, a second switching means to select in sequence each of said sources of light, the color of each source thus selected differing from that of the first selected source and to apply thereto a constant voltage the value of which is within the range of voltage of the said first device, said first and second switching means being so arranged that when the voltage of the first mentioned device equals the constant voltage the connections between said switching means and their selected sources will be effectively interchanged, whereby the constant voltage will be applied to the first selected source and the voltage from the first voltage-varying device will be applied to the second selected source, a third switching means to select a third source of light which differs in color from that selected by the first and second switching means and to connect to said third source the other of said light intensity-varying means, operating means common to all of said switching means and also to said voltage-varying devices to operate said means and said devices simultaneously, and indicating means controlled by said operating means to indicate the hue resulting from the blending of light from the selected sources.

10. In a control system for color lighting, in combination, four electrical sources of light, three of which provide dark hues of color and one a much paler hue, two dimmers, switching means to select in sequence each of said colors and to connect one of said dimmers to the selected color source, a second switching means to select in sequence a second color source differing in color from that first selected, and to apply a constant voltage thereto, said first and second switching means being so arranged as to interchange the connections from the switching means to the said selected color sources when the voltage of said first mentioned dimmer equals the constant voltage, a third switching means to select the source of paler hue and to connect the other dimmer thereto, operating means common to all switching means and dimmers to operate all simultaneously, said operating means being arranged to vary the voltage of said dimmers cyclically with movements of the said switching means.

11. The combination defined by claim 10 including means forming part of said common operating means to actuate one of said dimmers through a plurality of cycles during the period in which the other dimmer is actuated through one cycle.

12. In a control system for color lighting, in combination, three sources of light of dark hues of color, a source of light of paler hue, a source of variable voltage, switching means to select in sequence each of said sources of light of dark hues and to apply to the selected source a voltage from said voltage source which may be varied through a given range of values during the time in which said voltage source is connected to the selected source of light, a second switching means to select in sequence each of said sources of light of dark hues, the selected source differing in color from that selected by the first switching means and to apply thereto a constant voltage equal to the maximum voltage of the first mentioned source of variable voltage, said constant voltage being applied to said second source of light throughout the time in which the voltage from the first mentioned source of variable voltage is ranging in value from its minimum to its maximum value, said first and second switching means being so arranged as to interchange the connections between the said selected sources of light and their respective sources of voltage at the point of maximum value of said variable voltage thereby applying the constant voltage to the first mentioned source of color and applying the voltage from said variable source to the said second mentioned source of color, the application of constant voltage continuing until the variable voltage reaches its minimum, and a third switching means to connect said second voltage varying means to said source of light of paler hue and to maintain such connection throughout the period in which said first and second selected sources of light are connected to their switching means.

13. The combination defined by claim 12 further characterized by the inclusion of a second voltage-varying means and a third switching means to connect said second voltage-varying means to said source of light of paler hue and to maintain such connection throughout the period in which said first and second selected sources of light are connected to their respective switching means, the rates of variation of the voltage of said voltage-varying means differing from each other.

14. In a control system for color lighting, in combination, a plurality of sources of light each differing in color from the others, two light intensity-varying means, switching means to select one of said sources of color and to connect it to one of said intensity-varying means, a second switching means to select a second light source and to maintain constant the intensity of the light emitted thereby, a third switching means to connect the second of said intensity-varying means to a third light source, said second intensity-varying means being designed to produce two ranges of intensity variation, a plurality of preset switches to select the range of variation to be applied by said third switching means to the third light source, operating means common to said switching means and said light intensity-varying means to operate simultaneously all of said means, and indicating means to show the hue resulting from the blending of the colors thus selected.

15. The combination defined by claim 14 including means forming part of said common operating means to operate one of the said light intensity-varying means at a different rate from that of the other.

16. In a control system for color lighting, in combination, a plurality of electrical sources of colored light each differing in the hue of color from the others, two voltage-varying means, switching means to select a light source and to apply to it the voltage of one of said voltage-varying means, a second switching means to select a second light source and to apply to it a constant voltage, a third switching means to select a third light source and to apply to it the voltage of the second voltage-varying means, said second voltage-varying means being designed to produce two ranges of variable voltage, a plurality of preset switches to select the range of voltage variation to be applied by said third switching means to the third selected light source, and operating means for the simultaneous operation of said switching means and said voltage-varying means.

17. The combination defined by claim 16 further characterized by the provision of means in the first mentioned voltage-varying means to render the voltage constant throughout a portion of its cycle.

18. The combination defined by claim 16 further characterized by the provision of means in the first mentioned voltage-varying means to render the voltage constant throughout a portion of its cycle, both voltage-varying means being so adjusted that the voltages are out of phase.

19. In apparatus for controlling a color lighting system, in combination, a rotatable shaft having thereon a pinion and a crank, a second rotatable shaft having thereon a gear meshed with said pinion, selecting switches each having conductive segments and a brush-arm, said brush-arms being fastened to said second shaft and rotatable thereby, two voltage-varying devices each having a movable contact member thereon, driving means to effect the movement of said contact members, one of said driving means being movably connected to said crank and to one of said voltage-varying devices, the other driving means being movably connected to said gear and to the other of said voltage-varying devices.

20. In apparatus for controlling a color lighting system, in combination, two voltage-varying devices, selecting switches, each having conductive segments and a brush-arm, a rotatable shaft to which all of said brush-arms are fastened, means to effectively connect said shaft to said dimmers to vary the voltage thereof, a second rotatable shaft connected to said first mentioned shaft to effect the rotation thereof, and means to effectively connect said second shaft to the others of said voltage-varying devices to vary the voltage thereof.

21. In apparatus for controlling a color lighting system, in combination, a driving shaft and a driven shaft, both rotatable, means connecting said shafts to effect the rotation of the driven shaft, the ratio of the coupling being such that the driven shaft will revolve once during a plurality of revolutions of the driving shaft, selecting switches to select sources of colored light, each switch having conductive segments and a brush-arm, all of said brush-arms being fastened to the driven shaft, two voltage-varying devices for connection to a plurality of sources of light, means connected to each of said shafts to vary the voltage of one of said voltage varying devices.

22. The combination defined by claim 21 further characterized by the addition of indicating means to denote the hue resulting from the blending of the colors selected.

23. In apparatus for controlling a color lighting system, in combination, two voltage-varying devices for connection to a plurality of sources of light, two rotatable shafts coupled together, the ratio of coupling being such that one of said shafts will rotate once during one or more rotations of the other shaft, selecting switches to select sources of colored light, each switch having conductive segments and a brush-arm, all of said brush-arms being fastened to one of said shafts and arranged to make contact with the segments of said switching means, means connecting each of said shafts to one of said voltage-varying devices to effect a variation in the voltage produced thereby, the cyclic variation of voltage of one varying device being related to that of the other device.

24. In apparatus for controlling a color lighting system, in combination, two dimmers, two rotatable shafts coupled together, the ratio of coupling being such that one of said shafts will rotate once during one or more rotations of the other shaft, a plurality of segmental switching means, each having conductive segments and a brush-arm, said brush-arms being alignedly fastened to one of said shafts, means connecting each shaft to one of said dimmers to effect a variation in voltage produced thereby, the frequency of variation of voltage of one dimmer having a definite relation to that of the other dimmer.

25. In a control system for color lighting in which the light from selected sources is blended, in combination, four electrical sources of light, two light voltage-varying means, switching means to select each of three of said light sources and to connect the selected source to one of said voltage-varying means, a second switching means to connect the other voltage-varying means to one of the remaining sources of light, operating means common to both said switching means and to both said voltage-varying means to vary simultaneously the connections of said switching means and said voltage-varying means, and means to indicate the hue resulting from the blending of light from the selected sources.

ROLLO GILLESPIE WILLIAMS.

References Cited in the file of this patent

UNITED STATES PATENTS

| Number | Name | Date |
| --- | --- | --- |
| 1,483,710 | Black | Feb. 12, 1924 |
| 1,731,772 | Greenewalt | Oct. 15, 1929 |
| 1,772,606 | Hopkins | Aug. 12, 1930 |
| 1,945,635 | Greenewalt | Feb. 6, 1934 |

FOREIGN PATENTS

| Number | Country | Date |
| --- | --- | --- |
| 409,711 | Great Britain | May 4, 1934 |
| 411,868 | Great Britain | June 14, 1934 |
| 441,461 | Great Britain | Jan. 13, 1936 |